April 13, 1926.

C. M. GAUTIER 1,580,480

TIRE SHAPING MACHINE

Filed Nov. 14, 1923    3 Sheets-Sheet 1

INVENTOR

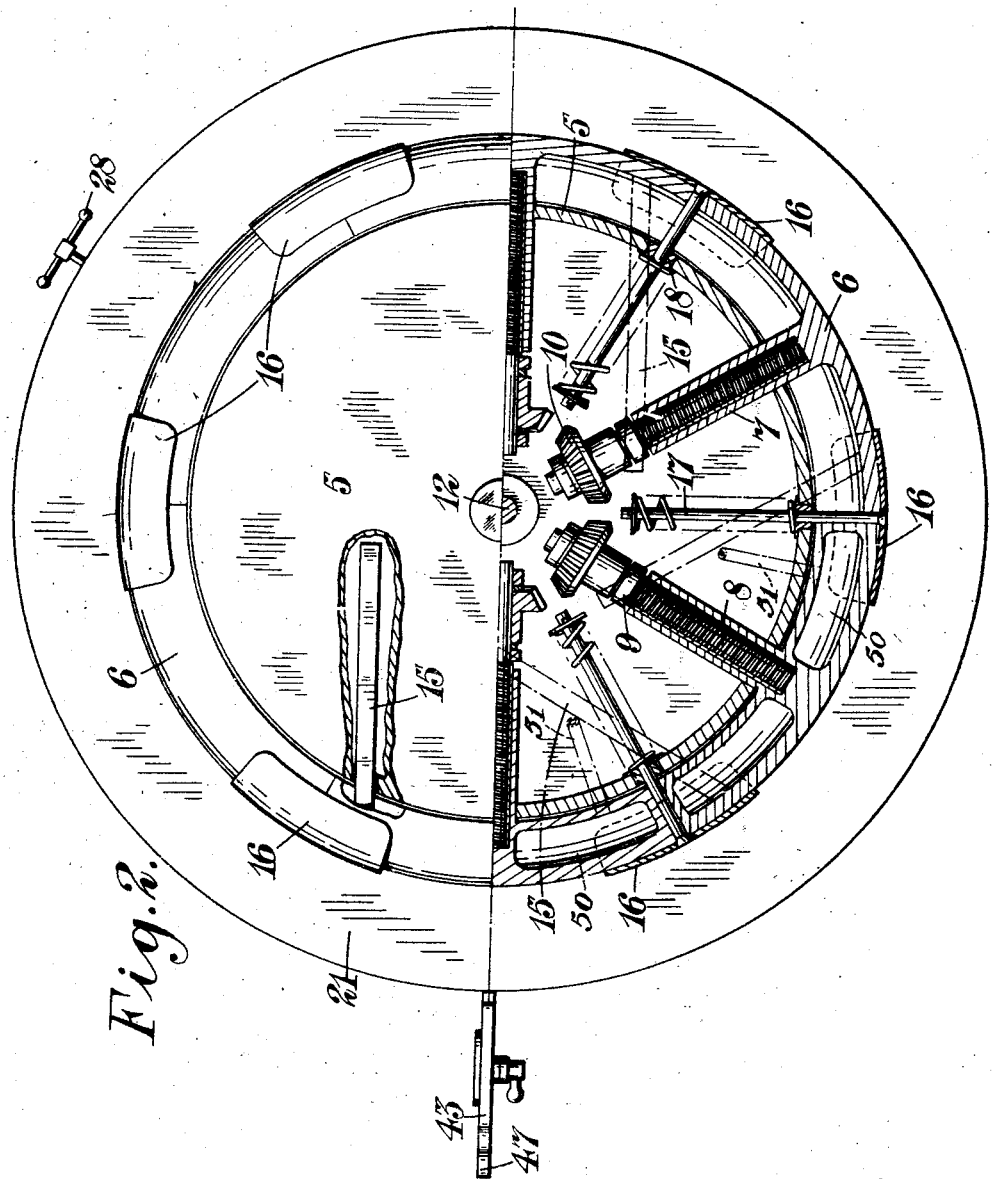

April 13, 1926.

C. M. GAUTIER 1,580,480

TIRE SHAPING MACHINE

Filed Nov. 14, 1923    3 Sheets-Sheet 3

Patented Apr. 13, 1926.

1,580,480

UNITED STATES PATENT OFFICE.

CLAUDE MARIE GAUTIER, OF LONDON, ENGLAND.

TIRE-SHAPING MACHINE.

Application filed November 14, 1923. Serial No. 674,687.

*To all whom it may concern:*

Be it known that I, CLAUDE MARIE GAUTIER, a citizen of the French Republic, residing at London, England, have invented certain new and useful Improvements in Tire-Shaping Machines, of which the following is a specification.

This invention is for improvements in or relating to tire-shaping machines of the type having an expanding core for shaping the fabric bands used in tire casings. The invention has for its main object to provide an improved machine of this type which shall be automatic in its action.

According to the present invention there is provided in a shaping machine for tire bands the combination with a core having mechanism arranged to be operated by power to expand or contract it at will, of control means arranged to be operated by the core or a part moving therewith when in its expanded or contracted position or both to automatically engage said core-operating mechanism with the driving means to contract or expand the core.

Conveniently the control means takes the form of a movable member having one or more stops for engagement with the core in its expanded or contracted positions or both, and operatively connected with a clutch (for example, a two-way clutch) to engage the core-operating mechanism with a driving shaft to rotate said mechanism in one direction to contract the core or in the reverse direction to expand the core.

Preferably a stop is adjustable towards and away from the periphery of the core in a radial direction and is arranged to be set to limit the expansion of the core to that required for tire bands of different diameter by contact with said core.

According to another feature of this invention a machine as above set forth is characterized by the provision of a band-locating plate on one side of the core parallel to the same and adjustable in the direction of the throughway axis of the core towards and away therefrom so that bands of different width may be automatically located and centralized around the core.

Other features of this invention will be hereinafter more fully described and pointed out in the claims.

In the accompanying drawings which illustrate a specific embodiment of this invention—

Figure 2 is a part sectional plan thereof,

Like reference numerals refer to like parts in the various figures.

Figure 1:
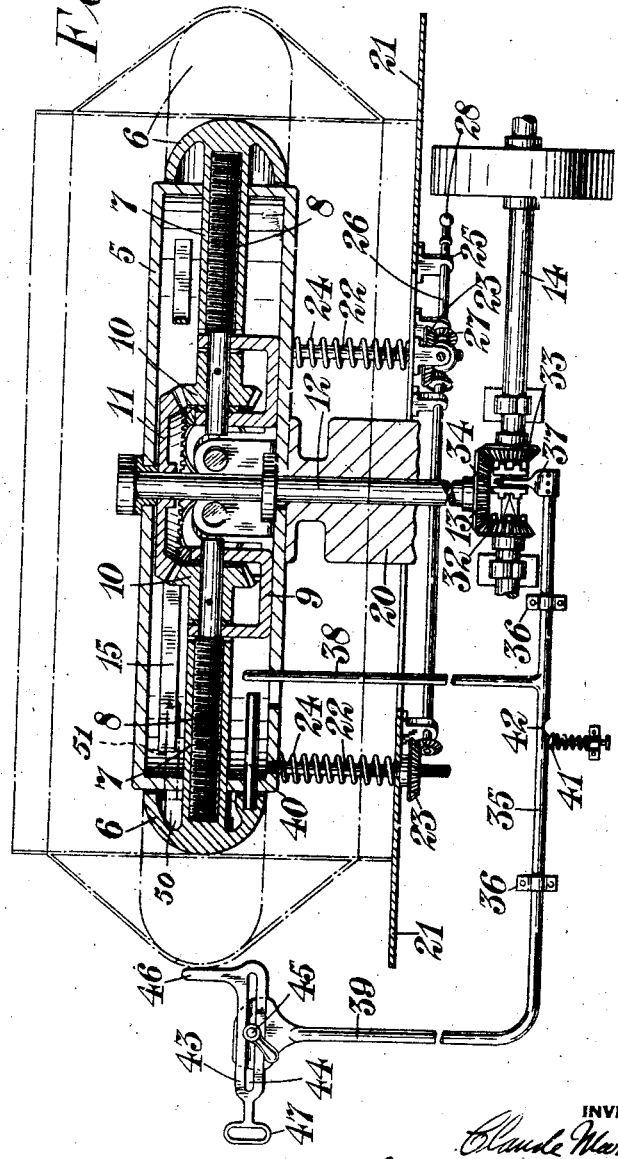
Figure 1 is a central sectional elevation of the machine.

The core comprises a drum-like casing 5 around the periphery of which is arranged a number of core segments 6 each of which is provided with an internally screw-threaded tubular stem 7 which passes through the peripheral wall of the casing and engages a screw-threaded rod 8 carried in a bracket 9 on the casing and having a bevel-pinion 10 fast thereon. The bevel pinion 10 of each rod meshes with the bevel wheel 11 fast on the central shaft 12 which carries also at its lower end a second bevel wheel 13 arranged to be driven as hereinafter described from the power shaft 14.

Each of the core segments 6 has attached to it a guide-rod which extends parallel to the said tubular stem 7 and passes freely through the peripheral wall of the casing 5 and acts as a guide to prevent lateral displacement of the core segments about the longitudinal axis of the stem.

Figure 3:
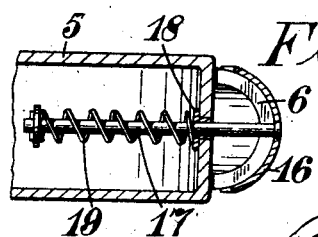
Figure 3 is a fragmentary sectional view illustrating the filling plates.

At each joint between the core segments is a filling plate 16 which is shaped to fit the core (see Figure 3) and is of sufficient length to bridge the gap between the segments when the core is fully expanded. A rod 17 attached to the plate passes through a guide bush 18 in the wall of the casing and carries a spring 19 arranged to keep the plate pressed against the core. Instead of the springs 19 the plates may be provided with fingers which project on each side of the rods 17 and engage the underside of the abutting core segments.

The core segments 6 may be heated by any suitable means, for example by steam or electricity. As indicated in chain-dotted lines on the left hand side of Figures 1 and 2 the core segments are cored out to provide chambers 50 therein to which steam is admitted by any desired means, such as the sliding pipe connections 51 indicated.

Figure 4:
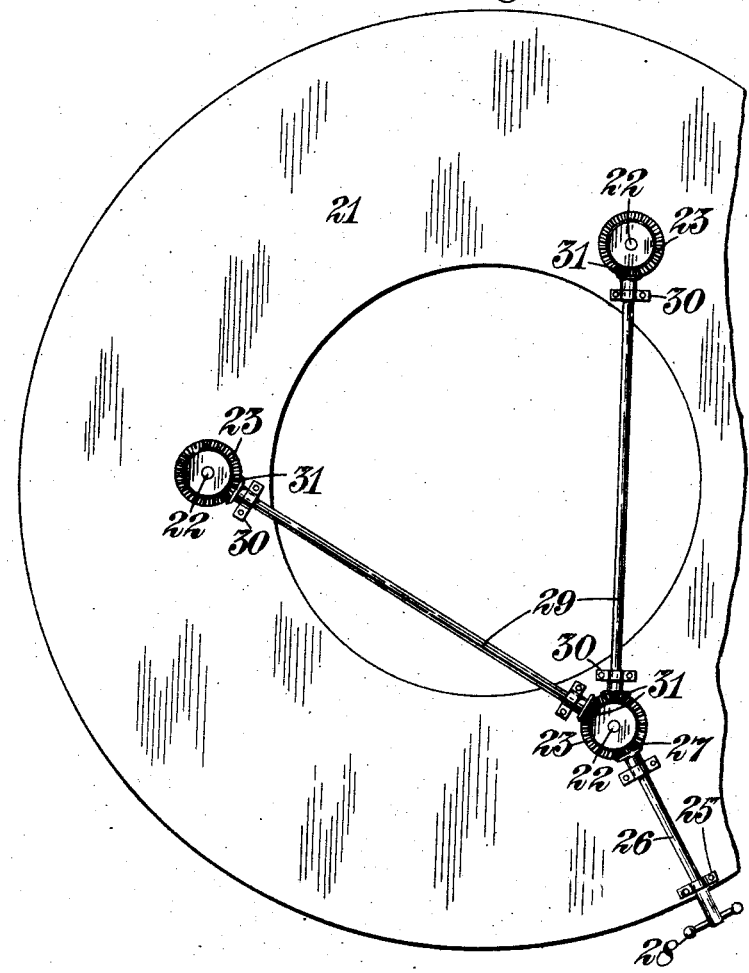
Figure 4 is an under plan of the band-locating plate.

The core casing 5 is supported in a horizontal position on a suitable frame 20 and arranged below the casing is an annular disc 21. Depending from the underside of the casing are three screw-threaded guide rods 22 which pass through holes in the disc 21 and carry at their lower ends the bevel pinions 23 which have internally screw-threaded bosses to engage the rods 22. Springs 24 on the rods keep the disc pressed against the bevel pinions and ensure positive movement. Carried in brackets 25 on the underside of the disc (see Figure 4) is a shaft 26, having at one end a bevel pinion 27 engaging one of the aforesaid bevel pinions 23 and at the other a hand wheel 28 whereby the shaft may be rotated. Shafts 29 carried in brackets 30 on the disc and having bevel pinions 31 at each end gearing with the pinions 23 on the guide rods 22, serve to transmit the rotation of the operating handle to move all the wheels on the rods 22 simultaneously.

The aforesaid power shaft 14 has loosely mounted on it two bevel pinions 32 and 33 which are constantly in mesh with the bevel wheel 13 on the core shaft 12. The opposing faces of the pinions 32 and 33 are provided with teeth which are adapted to be engaged by the teeth of a double-faced sliding dog 34 rotatable with the shaft 14. A rod 35, slidable in the brackets 36, carries at one end a fork 37 which engages the dog 34 and has upstanding stop arms 38 and 39 arranged to be engaged by one of the movable core segments 6. The stop arm 38 passes through a slot in the core casing 5 and projects in the path of travel of a tailpiece 40 on the core segment which also passes through the core casing. A spring stop 41 is arranged to engage a detent 42 in the rod 35 when the clutch is in neutral position.

The arm 39 carries an adjustable stop member 43 which is slotted at 44 and provided with a clamping screw 45 whereby it may be clamped to the arm 39 in the position required. One end of the stop member has an abutment 46 which is adapted to be engaged by the core, and the other end is provided with an operating handle 47.

In operation a tire band, indicated in chain dotted lines in Figure 1, is placed in position round the core and the disc 21 is adjusted to bring the centre of the band in line with the centre of the core. Conveniently, the bands are marked in the manner described in my co-pending patent application Serial No. 638,004, filed August 18, 1924, Patent Number 1,562,753 so that the locating operation is facilitated. The adjustable stop-member 43 is set according to the diameter to which the crown of the band is to be expanded and the power shaft 14 is set in motion. The clutch 34 engaging the bevel wheel 33 rotates the shaft 12 in the direction to expand the core. When the core contacts with the abutment 46 on the arm 39 the rod 35 is moved outwards, thus disengaging the clutch from the wheel 33 and bringing it into neutral position. By pulling the handle 47, the clutch is engaged with the wheel 32 which rotates the shaft 12 in the reverse direction to contract the core. In contracting, the finger 40 engages the stop arm 38 and moves the rod 35 in the reverse direction, thus disengaging the wheel 32, and bringing the clutch again into neutral position. The expanded band is removed and a fresh one placed in position; the handle 47 is then pushed to engage the clutch with the wheel 33 to again expand the core. It will be seen that when the plate 21 and stop member 43 have been set for a given size of tire band, the operation of the core is entirely automatic.

I claim:—

1. In a shaping machine for tire bands the combination of an expansible core, mechanism arranged to expand and contract it at will, driving means for operating said mechanism, and control means arranged to be operated by the core when in one of its extreme positions and arranged automatically to disengage the core-operating mechanism from the driving means.

2. In a shaping machine for tire bands the combination of an expansible core, means for expanding said core, and control means for said core-expanding means operable by the core when said core is in its extreme expanded position to render said core-expanding means inoperative on the core.

3. In a shaping machine for tire bands the combination of an expansible core, mechanism for expanding and contracting said core, a driving shaft, a clutch device arranged to connect said driving shaft with said core-operating mechanism, and control means operable by said core to control said clutch device.

4. In a shaping machine for tire bands the combination of an expansible core, mechanism for expanding and contracting said core, a driving shaft, a reversing gear clutch device arranged to connect said driving shaft with said core-operating mechanism to operate it in one direction to expand the core and in the reverse direction to contract the core, and control means operable by said core to control said reversing gear clutch device.

5. In a shaping machine for tire bands the combination of an expansible core, mechanism for expanding and contracting said core, a driving shaft, a clutch device arranged to connect said driving shaft with said core-operating mechanism, a movable member operatively connected with said clutch device, a radially adjustable stop on said movable member arranged to be engaged by the core in its expanded position, and a second stop on said movable member arranged to be engaged by an abutment on said core when in its contracted position.

6. In a shaping machine for tire bands the combination of an expansible core, means for expanding and contracting said core, control means operable by the core for controlling said core-expanding and contracting means, a band-locating plate on one side of the core parallel to the same, and means for adjusting said plate in the direction of the throughway axis of the core towards and away therefrom.

7. In a shaping machine for tire bands the combination of a drum-like casing, a plurality of core segments disposed around the periphery of said casing, a guide on each said core segment engaging a guideway in said casing, a screw-threaded spindle on each said core segment and projecting within said casing, a bevel pinion on each said spindle engaging a bevel-wheel on a central shaft, a driving shaft, a reversing gear clutch device for connecting said driving shaft with said central shaft and control means operable by a core segment for controlling said clutch device.

8. In a shaping machine for tire bands the combination of a drum-like casing, a support for said casing, a plurality of core segments disposed around the periphery of said casing, a guide on each said core segment engaging a guideway in said casing, a screw-threaded spindle on each said core segment and projecting within said casing, a bevel pinion on each said spindle engaging a bevel wheel on a central shaft, a driving shaft, a reversing gear clutch device for connecting said driving shaft with said central shaft, control means operable by a core segment for controlling said clutch device, an annular band-locating plate on one side of the casing parallel to the side faces thereof and means for adjusting said plate in the direction of the throughway axis of the core towards and away therefrom, substantially as set forth.

9. In a shaping machine for tire bands the combination of a drum-like casing, a support for said casing, a plurality of heatable core segments disposed around the periphery of said casing, means for heating said core segments, a guide on each said core segment engaging a guideway in said casing, a screw-threaded spindle on each said core segment and projecting within said casing, a bevel pinion on each said spindle engaging a bevel wheel on a central shaft, a driving shaft, a reversing gear clutch device for connecting said driving shaft with said central shaft, control means operable by a core segment for controlling said clutch device, an annular band-locating plate on one side of the casing parallel to the side faces thereof and means for adjusting said plate in the direction of the throughway axis of the core towards and away therefrom, substantially as set forth.

In testimony whereof I have signed my name to this specification.

CLAUDE MARIE GAUTIER.